United States Patent
Hatanaka et al.

(10) Patent No.: US 6,267,010 B1
(45) Date of Patent: Jul. 31, 2001

(54) INTEGRATED SENSOR DEVICE

(75) Inventors: Makoto Hatanaka, Handa; Kazuhisa Ikeda, Kariya, both of (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 08/948,826

(22) Filed: Oct. 10, 1997

(30) Foreign Application Priority Data

Oct. 14, 1996 (JP) .................................................. 8-271095

(51) Int. Cl.$^7$ ................................ G01L 19/04; G01L 7/00
(52) U.S. Cl. ................................................ 73/756; 73/708
(58) Field of Search ............................ 73/708, 721, 727, 73/756; 702/99; 374/145, 144

(56) References Cited

U.S. PATENT DOCUMENTS

| | | | |
|---|---|---|---|
| 4,563,902 | * | 1/1986 | Kohnlechner ........................... 73/708 |
| 4,797,007 | * | 1/1989 | Elmore, III ........................... 374/143 |
| 4,936,147 | * | 6/1990 | EerNisse et al. ........................ 73/702 |
| 5,063,784 | * | 11/1991 | Ridenour ................................. 73/756 |
| 5,597,091 | | 1/1997 | Mah et al. . |

FOREIGN PATENT DOCUMENTS

| | | |
|---|---|---|
| 54-153084 | 12/1979 | (JP) . |
| 59-154617 | 10/1984 | (JP) . |
| 1-290948 | 11/1989 | (JP) . |
| 2-242121 | 9/1990 | (JP) . |
| 3-125219 | 12/1991 | (JP) . |
| 5-187946 | 7/1993 | (JP) . |
| 7-239278 | 9/1995 | (JP) . |
| 7-270253 | 10/1995 | (JP) . |

\* cited by examiner

Primary Examiner—Benjamin R. Fuller
Assistant Examiner—Abdullahi Aw-musse
(74) Attorney, Agent, or Firm—Pillsbury Winthrop LLP (57) ABSTRACT

An integrated sensor device includes first and second housings combined together and is attached to a wall of a conduit via a joint portion thereof. Specifically, the first housing has the joint portion and a pressure conducting hole and holds a temperature measuring unit therein for detecting a temperature of a medium flowing in the conduit. The second housing holds a pressure measuring unit therein for measuring a pressure of the medium which has been conducted through the pressure conducting hole. Accordingly, several measuring units (sensors) can be attached to one portion of the conduit, so that the attachment process is simplified.

25 Claims, 11 Drawing Sheets

INTEGRATED SENSOR DEVICE

CROSS REFERENCE TO RELATED APPLICATION

This application is based upon and claims the benefit of priority of the prior Japanese Patent Application No. 8-271095 filed on Oct. 14, 1996, the contents of which are incorporated herein by reference.

BACKGROUND OF THE INVENTION

1. Field of the Invention

The present invention relates to an integrated sensor device that includes a plurality of sensor units and that can be attached to one portion of an external apparatus.

2. Related Art

Figure 17:
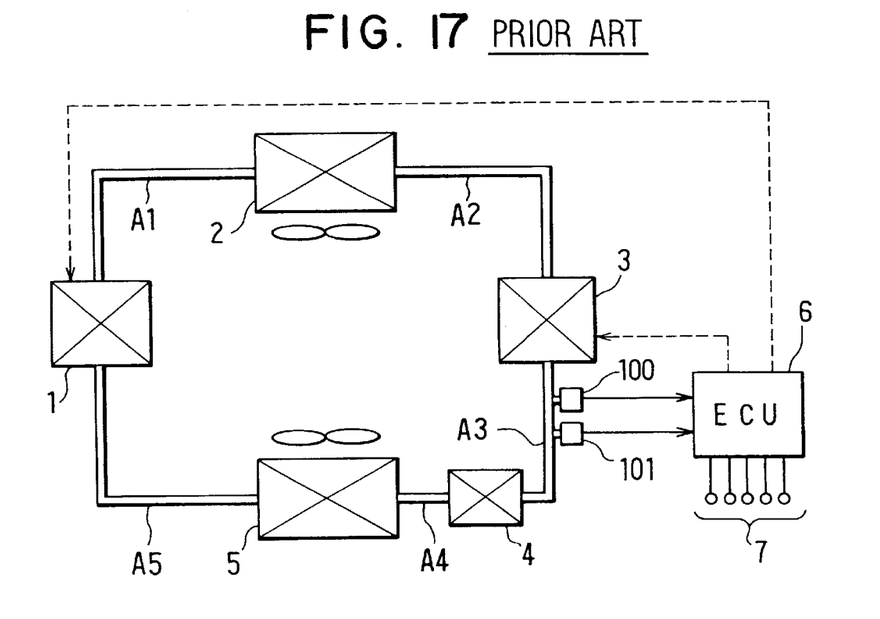
FIG. 17 is a schematic view showing a conventional air conditioning apparatus and several sensors which are separately attached to the air conditioning apparatus.

A conventional air conditioning apparatus for a vehicle is, as shown in FIG. 17, composed of a compressor 1, a heat exchanger 2, an expansion valve 3, a receiver 4, a condenser 5, and the elements. These components are connected in that order via conduits A1 to A5, to transport refrigerant therethrough, thereby forming a refrigerating cycle.

A temperature sensor 100 and a pressure sensor 101 are disposed on a wall of the conduit A3 connecting the receiver 4 and the expansion valve 3. Output wiring extending from the sensors 100 and 101 are connected to an electronic control unit (hereinbelow referred to as an ECU) 6 to which a plurality of wires are connected from a sensor group 7. The refrigerant is suddenly expanded by the expansion valve 3 to be a low temperature and low pressure liquid, and its temperature and pressure are respectively detected by the temperature sensor 100 and the pressure sensor 101. An on-off control of the compressor 1 and a control of the valve position of the expansion valve 3 are performed based on the detected values of the temperature sensor 100 and the pressure sensor 101. The temperature sensor 100 and the pressure sensor 101 are respectively attached to hole portions formed in the wall of the conduit A3.

In this case, however, the temperature sensor 100 and the pressure sensor 101 have to be attached to the respective hole portions of the conduit A3, and attaching process is complicated. Further, in a case where several properties of the refrigerant are to be detected by respective sensors, there will be a need to form several hole portions in the wall of the conduit to respectively connect the sensors, and then, the sensors respectively have to be attached to the hole portions. As a result, the attachment process of the sensors to the hole portions becomes more complicated.

SUMMARY OF THE INVENTION

In view of the above-mentioned problem in the prior art, an object of the present invention is to simplify a process for attaching several sensors to a specified portion of an attachment device.

According to the present invention, an integrated sensor device, which is to be attached to an attachment device holding a medium therein, includes a housing, and first and second measuring units held in the housing for respectively detecting first and second states of the medium. The housing has a joint portion to be attached to the attachment device and a conducting hole for conducting the medium into the housing so that both of the first and second measuring units can detect the state of the medium.

Preferably, the housing has first and second housings respectively holding the first and second measuring units therein and respectively having first and second joint portions. In a case where the first joint portion of the first housing is joined to the attachment device, the second joint portion of the second housing is joined to the first housing. on the other hand, in a case where the second joint portion of the second housing is joined to the attachment device, the first joint portion of the first housing is joined to the second housing. More preferably, the first and second joint portions of the first and second housings are external threads having the same diameter each other. Further, a third housing holding a third measuring unit therein may be disposed between the first and second housings. The order combining the above-mentioned housings may be changed as required, as well. As a result, the housings including the respective measuring units can be attached to one portion of the attachment device, and the attachment process can be simplified.

BRIEF DESCRIPTION OF THE DRAWINGS

Other objects and features of the present invention will become more readily apparent from a better understanding of the preferred embodiments described below with reference to the following drawings.

DETAILED DESCRIPTION OF PREFERRED EMBODIMENTS

Embodiments according to the present invention will be described hereinunder with reference to the drawings.

(First Embodiment)

Figure 1:
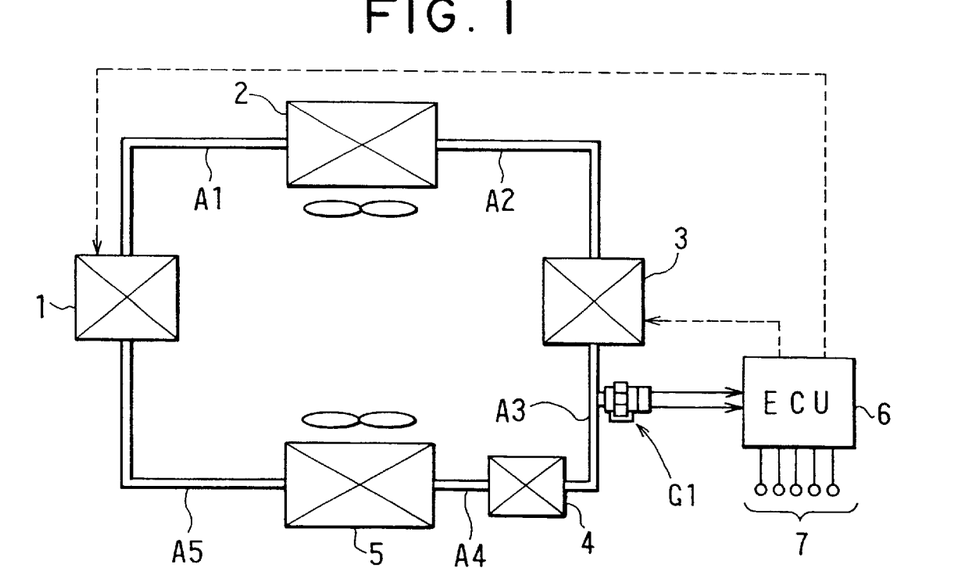
FIG. 1 is a schematic view showing an integrated sensor device applied to an automotive air conditioning apparatus in a preferred first embodiment according to the present invention.

In a first preferred embodiment, an integrated sensor device Gi according to the present invention is, as shown in FIG. 1, applied to an automotive air conditioning apparatus. As mentioned above, the automotive air conditioning apparatus is composed of a compressor 1, a heat exchanger 2, an expansion valve 3, a receiver 4, a condenser 5, and the like. The integrated sensor device G1 is provided on a wall of a conduit (a part of an attachment device) A3 connecting the expansion valve 3 and the receiver 4, and output wiring extending from the integrated sensor device G1 are connected to an ECU 6.

Figure 2:
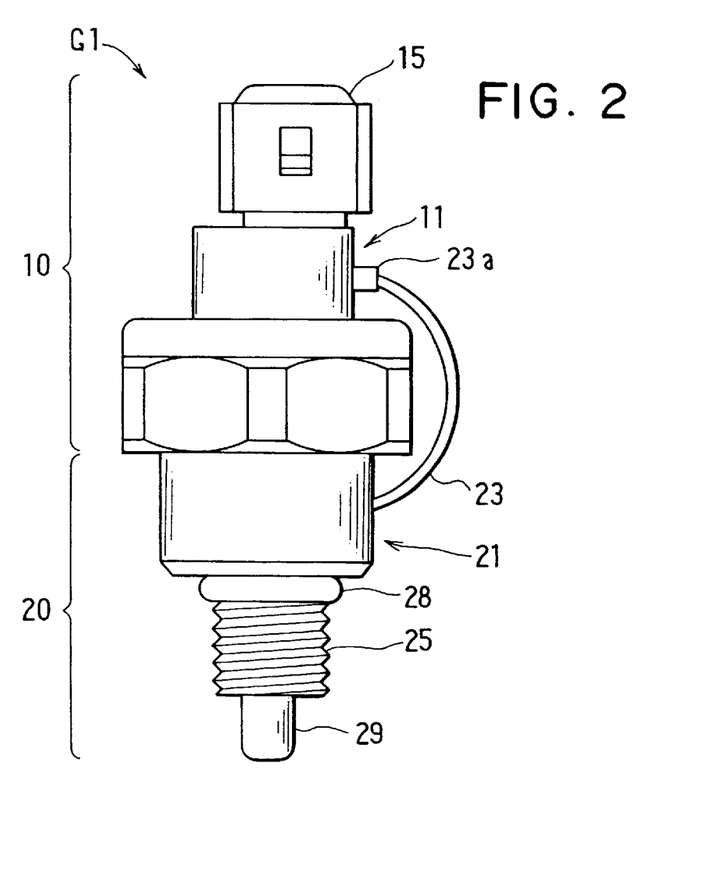
FIG. 2 is a schematic view showing the integrated sensor device in the first embodiment.
Figure 3:
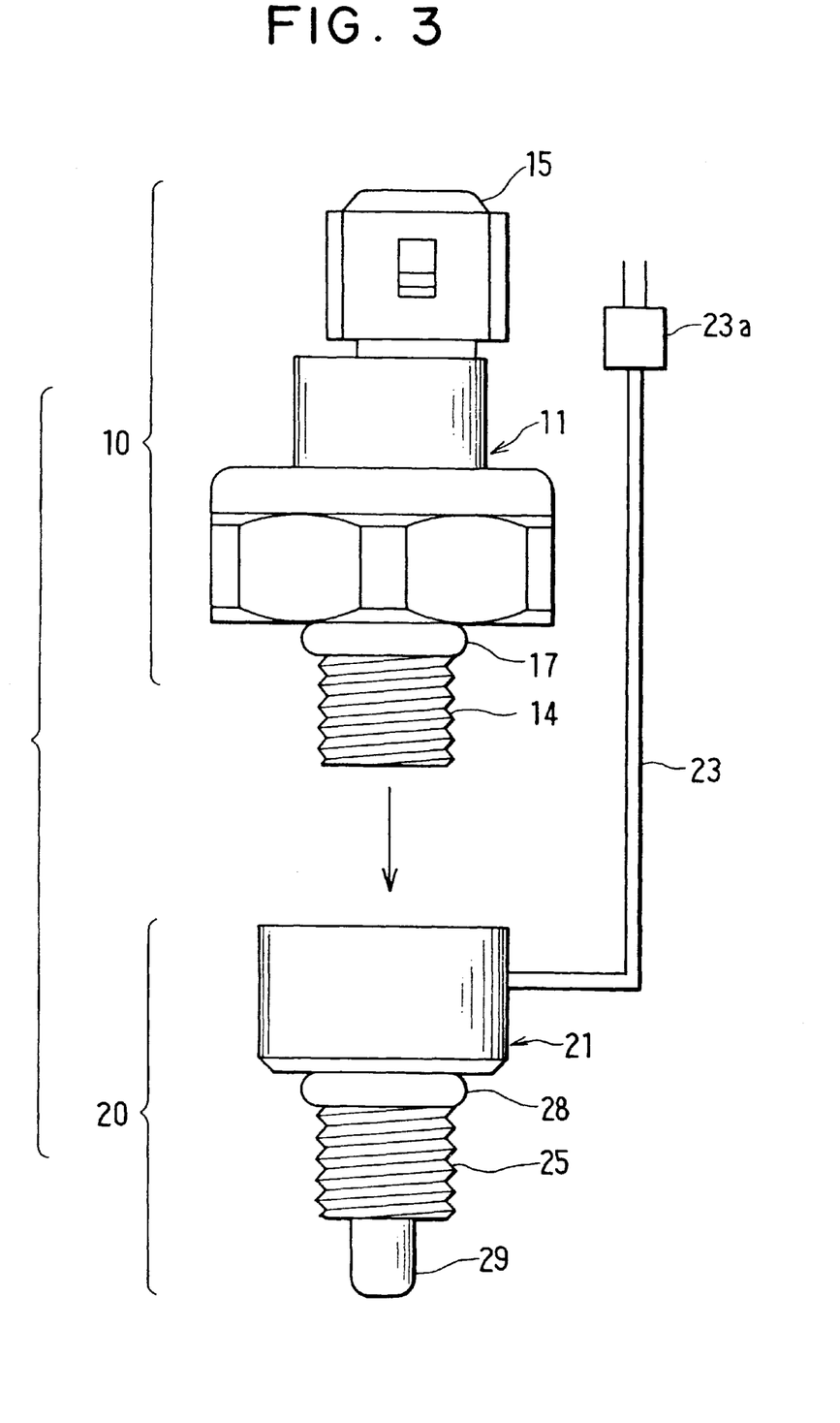
FIG. 3 is an exploded schematic view of the integrated sensor device in the first embodiment.
Figure 4:
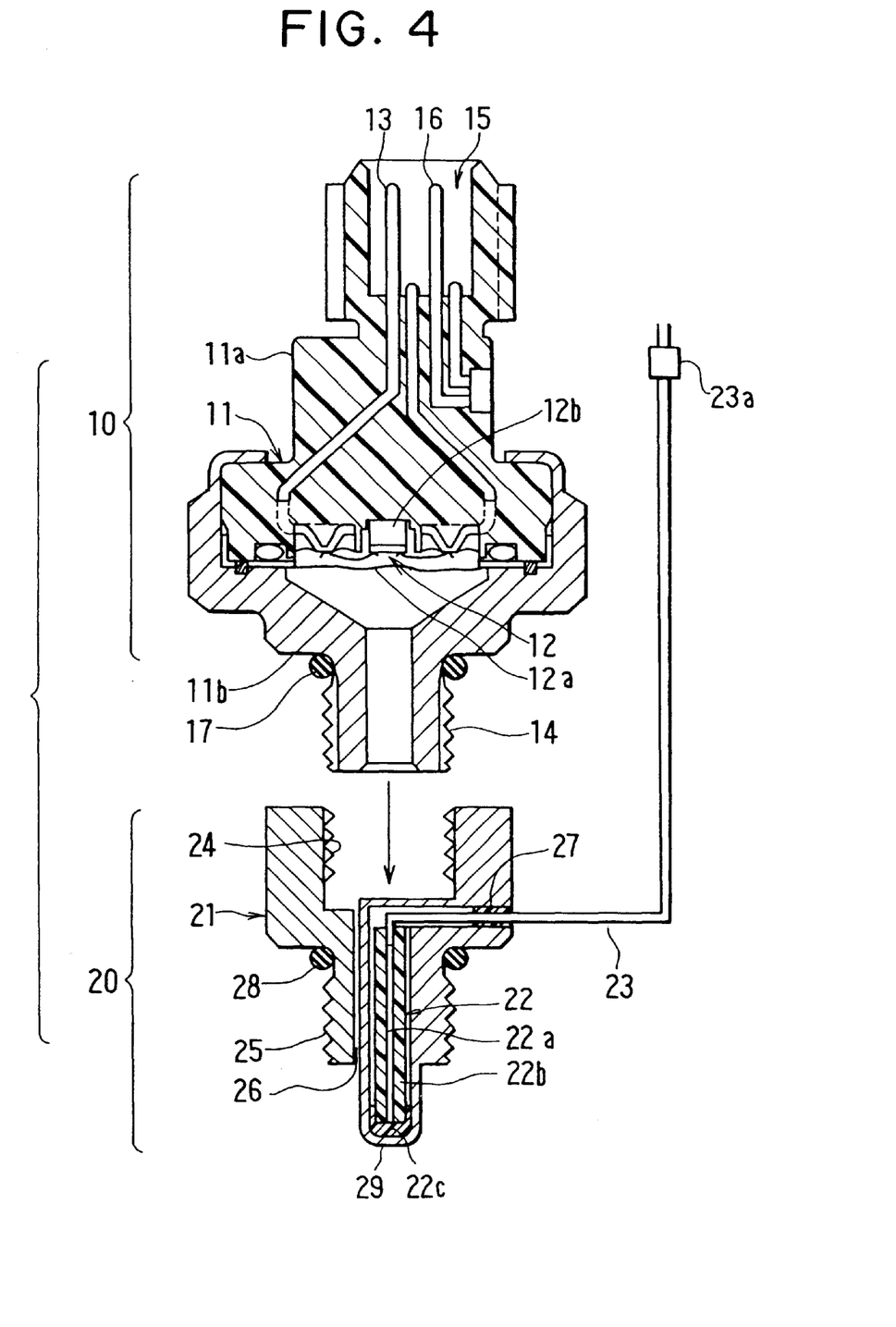
FIG. 4 is an exploded cross-sectional view showing the integrated sensor device in the first embodiment.

As shown in FIGS. 2 and 3, the integrated sensor device G1 is composed of two parts (sensors), namely, a pressure measurement part 10 and a temperature measurement part 20 which are joined together to be attached to the wall of the conduit A3. As shown in FIG. 4, the pressure measurement part 10 has a first housing 11, a pressure measuring unit (a first measuring unit) 12 held inside the housing 11, an output terminal 13 connected to the pressure measuring element 12, and the like. The first housing 11 has an upper housing 11a made of resin and a lower housing 11b made of metal. The lower housing 11b has an external thread (an external joint portion) 14 which is intended to be inserted into the temperature measurement part 20. Further, an O-ring 17 is disposed on an upper end portion of the external thread 14 in FIG. 4. The O-ring keeps air tightness between the pressure measurement part 10 and the temperature measurement part 20 to prevent leakage of refrigerant (medium) from the joint portion therebetween.

The pressure measuring unit 12 includes a diaphragm 12a and a piezoresistance element 12b. The pressure of the refrigerant flowing in the conduit A3 is detected by the pressure measuring unit 12 and an output signal indicative of the pressure of the refrigerant is provided by the pressure measuring unit 12 to the ECU 6 through the output terminal 13 arranged in a connector 15 shown in FIG. 4.

The temperature measurement part 20 has a second housing 21, a temperature measuring unit (a second measuring unit) 22 held within the second housing 21, an output wiring 23 extending from the temperature measuring unit 22, and the like. The second housing 21 has an internal thread (an internal joint portion) 24 which is intended to receive the external thread 14 of the pressure measurement part 10, and an external thread (a joint portion) 25 which is to be inserted into the wall of the conduit A3. The second housing 21 additionally has a pressure conducting hole 26 therein so that the pressure measuring unit 12 of the pressure measurement part 10 communicates with the conduit A3 through the pressure conducting hole 26. An output terminal 16 for transmitting an output signal from the temperature measuring unit 22 to the ECU 6 is provided in the connector 15 of the pressure measurement part 10.

In the first embodiment, a thermistor 22a is employed as a temperature measuring element provided in the temperature measuring unit 22. The thermistor 22a is covered with a support member 22b to be immersed in a filling member (a heat transferring member) 22c. An outlet of the second housing 21 from which the output wiring 23 protrudes is closed with a resin 27 so that the temperature measuring unit 22 is airtight.

In addition, an O-ring 28 is disposed on an upper portion of the external thread 25 of the second housing 21 in FIG. 4 to prevent the leakage of the refrigerant from a hole formed in the wall of the conduit A3. An end portion 23a of the output wiring 23 protruding from the thermistor 22a is connected to the output terminal 16 via a socket provided on an outer surface of the first housing 11 of the pressure measurement part 10. The output terminal 16 extends to the connector 15. Accordingly, the refrigerant temperature detected by the thermistor 22a is electrically transmitted to the ECU 6 through the output wiring 23 and the output terminal 16. In this embodiment, the output terminals 13 and 16 for providing the output signals from the pressure and temperature measuring units 12 and 22 are arranged in the same connector 15. Therefore, the connection between the output terminals 13 and 16 and an outside member (for example, a standard connector according to the specifications of the Japanese Industrial Standards (JIS)) can be simplified.

The external thread 14 of the pressure measurement part 10 is screwed into the internal thread 24 of the temperature measurement part 20, so that the integrated sensor device G1 is obtained. Then, the external thread 25 of the temperature measurement part 20 is screwed into the hole formed in the wall of the conduit A3, so that the integrated sensor device G1 is attached to the wall of the conduit A3. Next, operations of the thus attached integrated sensor device G1 will be explained. The integrated sensor device G1 starts to operate as soon as a switch (not shown) of the automotive air conditioning apparatus is turned on. Simultaneously, the above-mentioned components 1 to 5 of the air conditioning apparatus start to operate, so that the refrigerant start to flow in the components 1 to 5 and in the conduits A1 to A5. In the conduit A3, the refrigerant flows to make contact with an front end portion 29 (refer to FIG. 2) of the integrated sensor device G.

Accordingly, the resistance of the thermistor 22a in the temperature measurement part 20 changes in response to the temperature of the refrigerant to change a value of current flowing in the thermistor 22a. Then, the output signal corresponding to the temperature of the refrigerant is transferred to the ECU 6. On the other hand, in the pressure measurement part 10, the refrigerant enters the pressure conducting hole 26, so that the diaphragm 12 is displaced due to the pressure of the refrigerant. The piezoresistance element 12b formed on the diaphragm 12a is distorted in response to the displacement of the diaphragm 12a, so that the resistance of the piezoresistance element 12b varies in response to the distortion thereof. As a result, a value of current flowing in the piezoresistance element 12b varies. Then, the output signal according to the pressure of the refrigerant is provided to the ECU 6.

Further, a compartment temperature sensor for detecting a temperature in a compartment of a vehicle is installed in the compartment, and provides detected data to the ECU 6. The ECU 6 performs an on-off control of the compressor 1, a control of the valve position of the expansion valve 3, and the like, on the basis of the temperature and pressure of the refrigerant and the temperature in the compartment.

In this embodiment, there is no need to form holes in the wall of the conduit A3 for respectively receiving the pressure measurement part 10 and the temperature measurement part 20. Instead, only one hole needs to be provided on the wall of the conduit A3 for receiving the integrated sensor device G1. Therefore, the process for attaching several sensors (the pressure measurement part 10 and the temperature measurement part 20) to the wall of the conduit A3 can be simplified. In addition, because the wall of the conduit A3 has the only one hole to receive the several sensors, the refrigerant (e.g., freon) is not likely to leak from the conduit A3 as compared with a case where several holes are formed on the wall of the conduit A3 to receive the several sensors.

Further, in the case where the several holes are formed on the wall of the conduit A3 to receive the several sensors, the sensors cannot be provided on the same position on the wall of the conduit A3. Therefore, it is difficult for the sensors to detect respective detective factors under the same conditions. As opposed to this, in this embodiment, the sensors for measuring the temperature and the pressure can be attached to the same position on the wall of the conduit A3, thereby resulting in high measurement accuracy.

Furthermore, in the case where several sensors are attached to the respective holes, there will be a need of a large installation space in accordance with the number of the sensor. However, in this embodiment, the integrated sensor device G1 is attached to only one part of the conduit A3, and then, there is no need of a large installation space. Although the front end portion 29 of the integrated sensor device G1 protrudes into the conduit A3 in this embodiment, the same effects can be obtained even if the front end portion 29 does not protrude into the conduit A3.

In the first embodiment, as shown in FIG. 4, because the pressure conducting hole 26 and the thermistor 22a are provided in parallel with each other through a wall portion of the second housing 21, the temperature of the refrigerant flowing in the pressure conducting hole 26 can be easily detected by the thermistor 22a. Further, in the first embodiment, because the pressure measurement part 10 and the temperature measurement part 20 are separately formed before being combined together, there is no need to form the first housing 11 of the pressure measurement part 10 and the second housing 21 of the temperature measurement part 20 from the same material. For example, aluminum having a high heat conductivity is suitable for the second housing 21 of the temperature measurement part 20, and iron which can be easily welded is suitable for the first housing 11 of the pressure measurement part 10.

(Second Embodiment)

Figure 5:
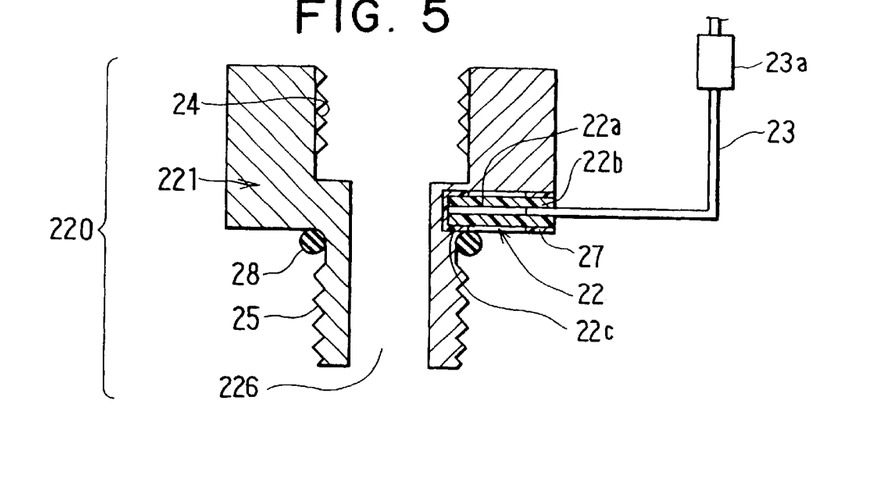
FIG. 5 is a cross-sectional view showing a temperature measurement part of an integrated sensor device in a second preferred embodiment according to the present invention.

In a second preferred embodiment, a temperature measurement part 220 shown in FIG. 5 is employed in place of the temperature measurement part 20 in the first embodiment. The parts and components similar to those in the first embodiment are shown by the same reference numerals and description thereof will be omitted. The temperature measurement part 220 is constructed such that a pressure conducting hole 226 provided therein can have a specific diameter at least. In detail, as shown in FIG. 5, a recess for receiving the thermistor 22a therein is formed in a second housing 221 to extend perpendicularly to a flowing direction of the refrigerant in the pressure conducting hole 226 so that it does not block the flow of the refrigerant through the pressure conducting hole 226.

Accordingly, the same effects as in the first embodiment can be obtained. In addition, because the pressure conducting hole 226 can have a large diameter, the pressure of the refrigerant can be accurately transmitted to the pressure measurement part 10. Because of this, even if a viscous fluid which does not easily flow is utilized as a medium in place of the refrigerant, the pressure of the medium can be securely transferred to the pressure measurement part 10. Further, by employing the above-mentioned structure, the thermistor 22a can be easily installed into the second housing 221 even after the temperature measurement part 220 and the pressure measurement part 10 are joined together.

(Third Embodiment)

Figure 6:
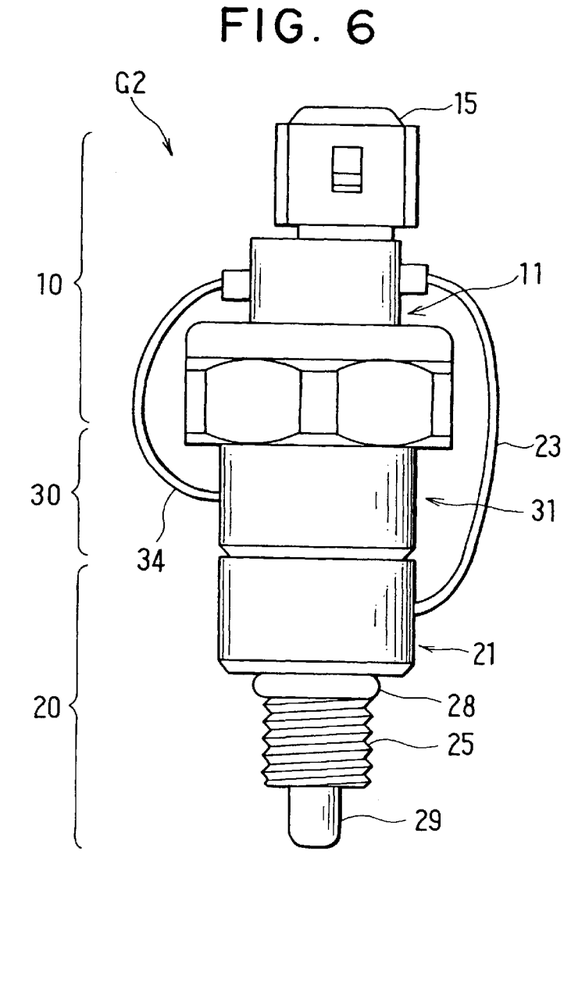
FIG. 6 is a schematic view showing an integrated sensor device in a third preferred embodiment according to the present invention.
Figure 7:
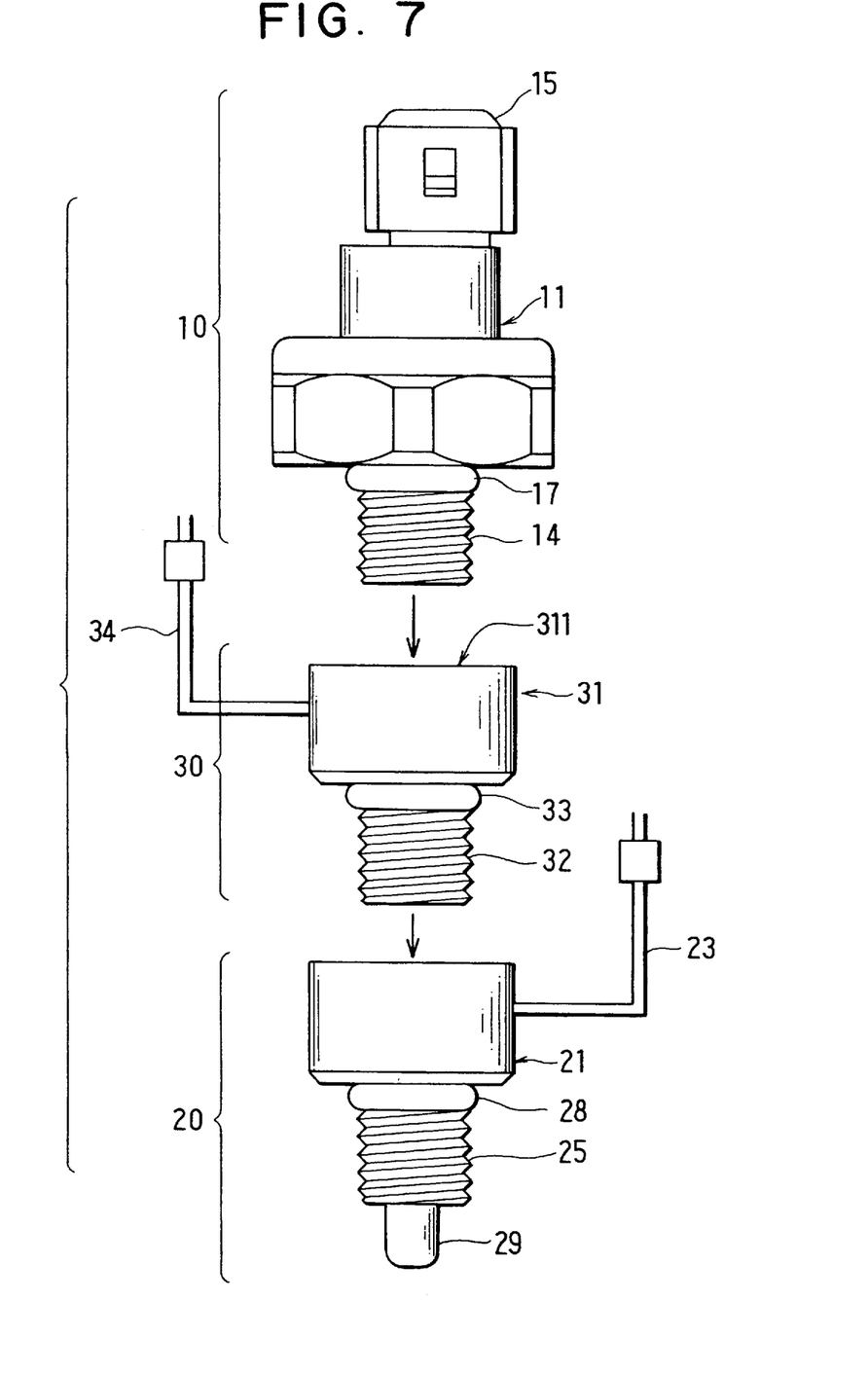
FIG. 7 is an exploded schematic view of the integrated sensor device in the third embodiment.

In a third preferred embodiment, an integrated sensor device G2 shown in FIGS. 6 and 7 includes an acceleration measurement part (acceleration sensor) 30 functioning as a third measurement part in addition to the pressure measurement part 10 and the temperature measurement part 20 in the first embodiment. The acceleration measurement part 30 is disposed between the pressure measurement part 10 and the temperature measurement part 20. The parts and components similar to those in the first embodiment are indicated by the same reference numerals and the description thereof will be omitted.

The acceleration measurement part 30 has, as shown in FIG. 7, a third housing 31 and an acceleration measuring unit held in the third housing 31. The third housing 31 is composed of an internal thread 311 (internal joint portion) which is to receive the external thread 14 of the pressure measurement part 10, and an external thread 32 (external joint portion) which is to be inserted into the internal thread 24 of the temperature measurement part 20. The third housing 31 also has a pressure conducting hole (not shown) therein so that the pressure measuring unit 12 of the pressure measurement part 10 communicates with the refrigerant conduit A3. Further, an O-ring 33 is provided on an upper end of the external thread 32 in FIG. 7. Accordingly, the airtightness between the acceleration measurement part 30 and the temperature measurement part 20 can be kept to prevent the leakage of the refrigerant.

The acceleration measuring unit includes a cantilever spring portion which detects the amount of the acceleration of the refrigerant and electrically outputs the output signal according to the amount of the acceleration to the ECU 6 through an output wiring 34 and the connector 15 of the pressure measurement part 10. Here, an output terminal which is not shown are disposed in the connector 15 to transfer the output signal from the acceleration measurement part 30 to the ECU 6. That is, in the third embodiment, each of the measurement parts 10, 20, and 30 is electrically connected to the ECU 6 through the connector 15 so that the output signals according to the pressure, temperature and acceleration of the refrigerant are provided to the ECU 6.

The pressure measurement part 10 and the temperature measurement part 20 operate in the same manner as in the first embodiment. In the acceleration measurement part 30, the cantilever spring is bent due to the flow (vibrations) of the refrigerant which has passed through the pressure conducting hole, and the acceleration measurement part 30 generates the output signal corresponding to the deflection of the cantilever spring. When the voids produced in the medium (refrigerant) burst, the resulting vibrations may produce resonance in the conduits. Therefore, the state of occurrence of voids in the refrigerant can be detected by the acceleration measurement part 30.

The ECU 6 controls the air conditioning apparatus to prevent the conduits from being damaged due to the resonance thereof caused by the vibrations of the medium (refrigerant), on the basis of the output signals outputted from the measurement parts 10, 20, and 30 and the compartment temperature sensor. In this way, even in the case where more than three sensors are combined together, the sensors can be installed into only one hole formed in the wall of the conduit or the like. As a result, the same effects as in the first embodiment can be obtained.

In the third embodiment, although the acceleration measurement part 30 is disposed between the temperature measurement part 20 and the pressure measurement part 10, the temperature measurement part 20 may be disposed between the pressure measurement part 10 and the acceleration measurement part 30. In the case where the diameter of the internal thread 311 of the acceleration measurement part 30 is equal to the diameter of the internal thread 24 of the temperature measurement part 20, the order combining the measurement parts 20 and 30 is changeable.

(Fourth Embodiment)

Figure 8:
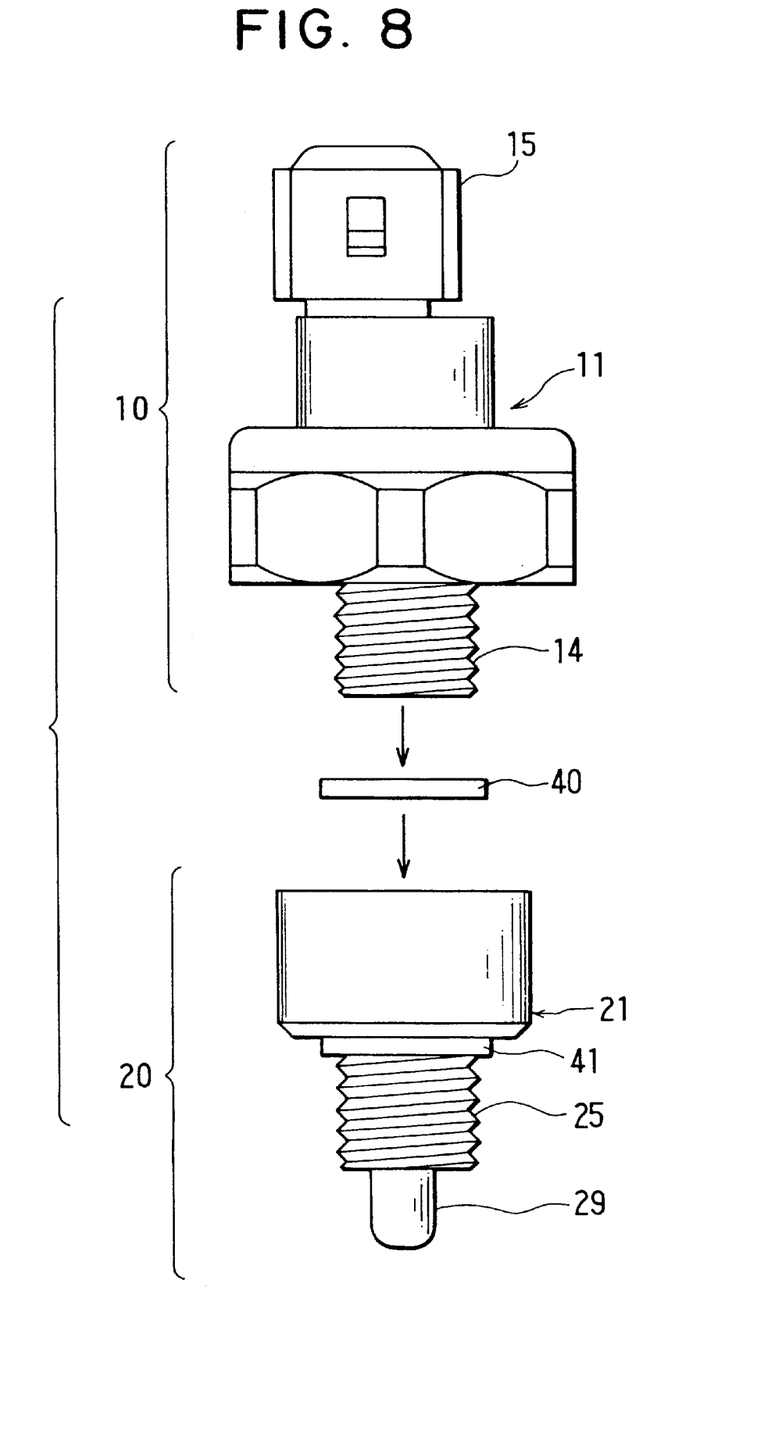
FIG. 8 is an exploded schematic view of an integrated sensor device in a fourth preferred embodiment according to the present invention.

In the first embodiment, the O-rings 17 and 28 are utilized to keep airtightness between the pressure measurement part 10 and the temperature measurement part 20, and between the conduit A3 and the temperature measurement part 20. However, some kinds of refrigerants may adversely affect the O-rings 17 and 28. Therefore, in the case where such kinds of refrigerants are used, as shown in FIG. 8, metallic gaskets 40 and 41 can be used in place of the O-rings 17 and 28. It is apparent that the metallic gaskets are applicable to the integrated sensor device G2 in the third embodiment.

(Fifth Embodiment)

Figure 9:
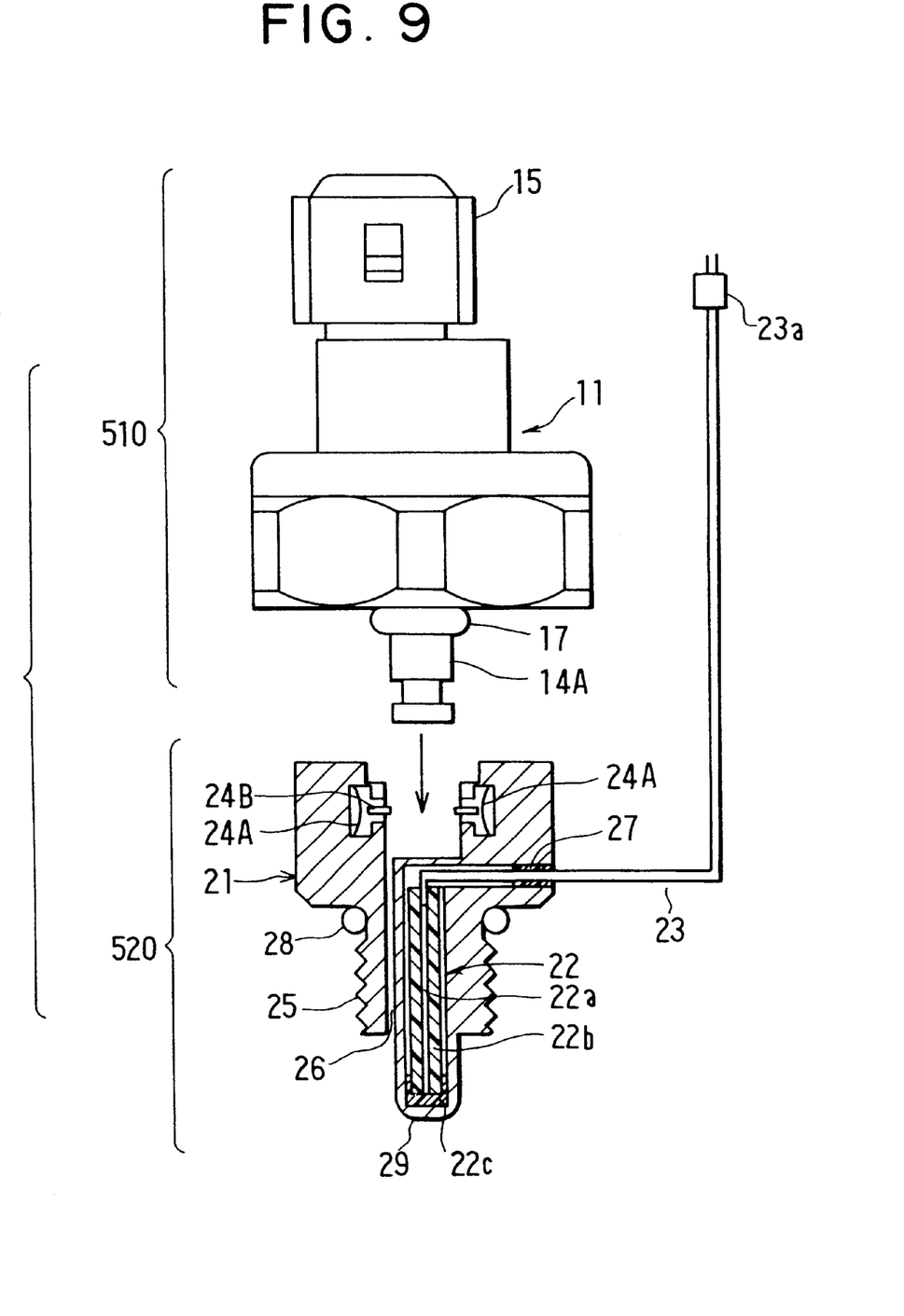
FIG. 9 is an explanatory view showing an integrated sensor device in a fifth preferred embodiment according to the present invention.

In the first and second embodiments, the pressure measurement part 10 and the temperature measurement part 20 are joined together by the external and internal threads 14 and 24 thereof. As opposed to this, in a fifth preferred embodiment, as shown in FIG. 9, a temperature measurement part 520 has a spring 24A and a fixed hook portion 24B in place of the internal thread 24, and a pressure measurement part 510 has an engagement portion 14A in place of the external thread 14. The engagement portion 14A of the pressure measurement part 510 is engaged with the fixed hook portion 24B of the temperature measurement part 520, so that the integrated sensor device G3 shown in FIG. 10 can be formed only by pushing the pressure measurement part 510 to the temperature measurement part 520.

Figure 10:
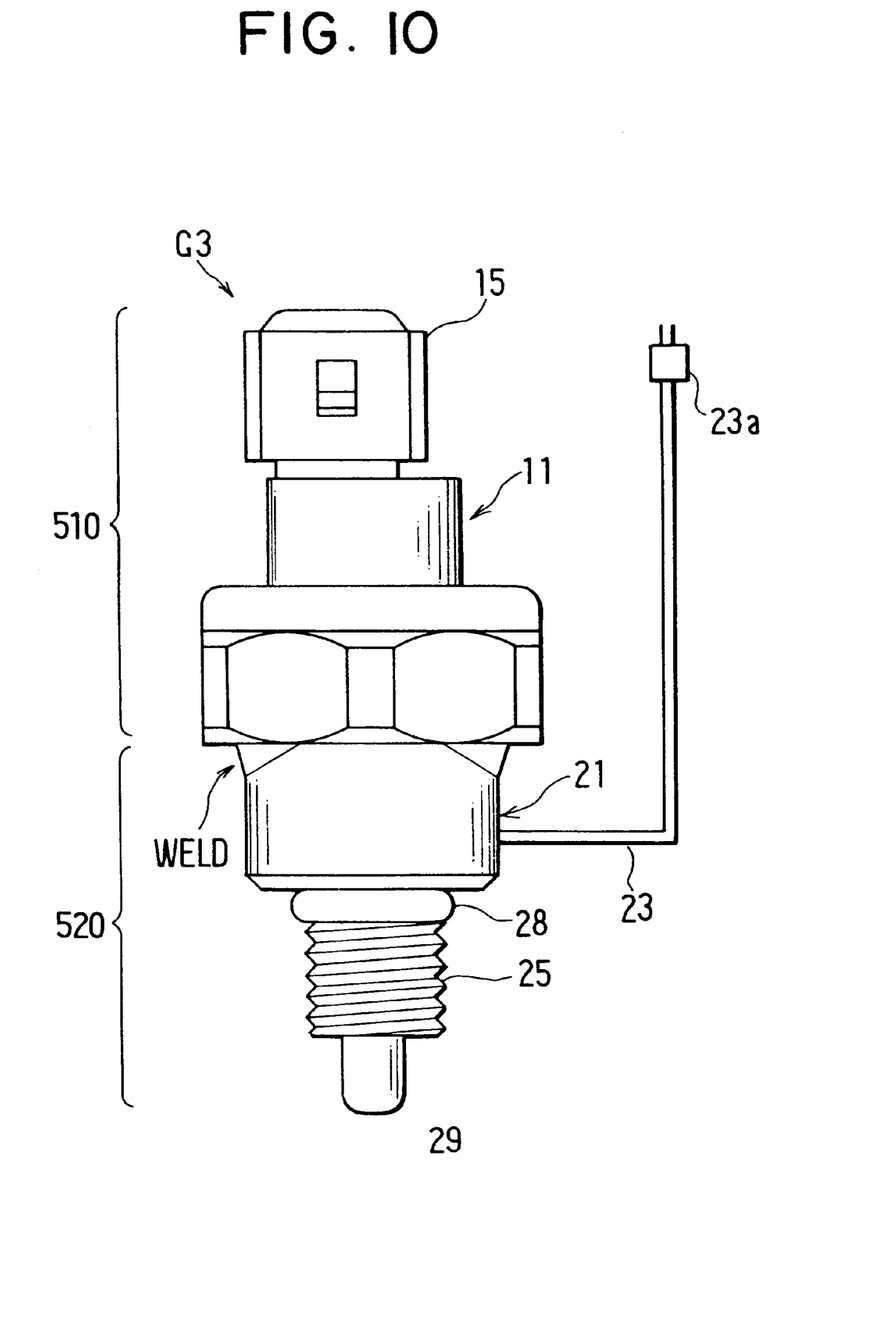
FIG. 10 is a schematic view showing the integrated sensor device in the fifth embodiment.

After the pressure measurement part 510 and the temperature measurement part 520 are combined together, as shown in FIG. 10, the first and second housing 11 and 21 are welded together to securely keep the airtightness therebetween. In this case, it is not always necessary to provide the O-ring 17 between the first and second housing 11 and 21 to keep the airtightness therebetween.

(Sixth Embodiment)

Figure 11:
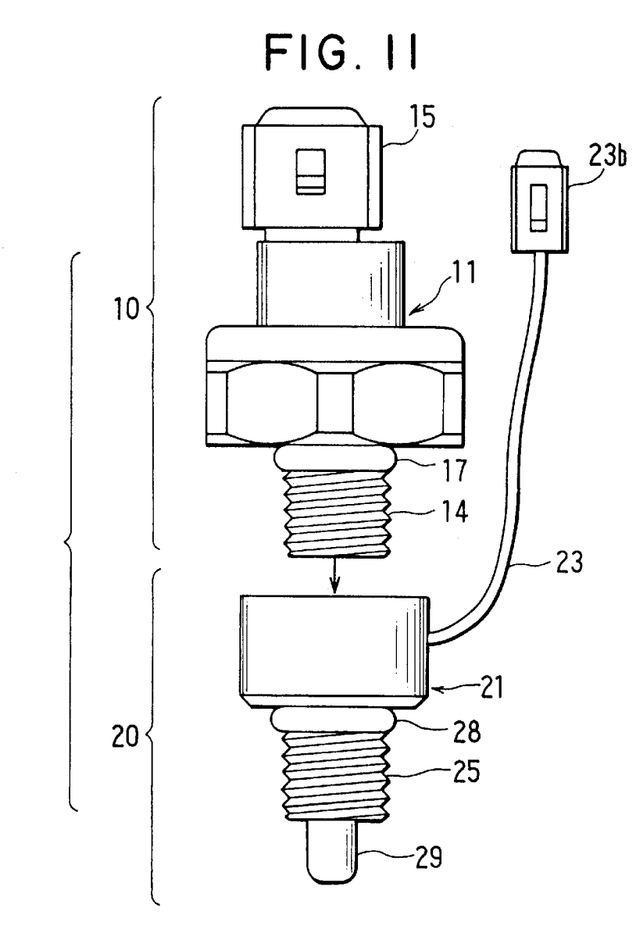
FIG. 11 is an exploded schematic view showing an integrated sensor device in a sixth preferred embodiment according to the present invention.
Figure 12:
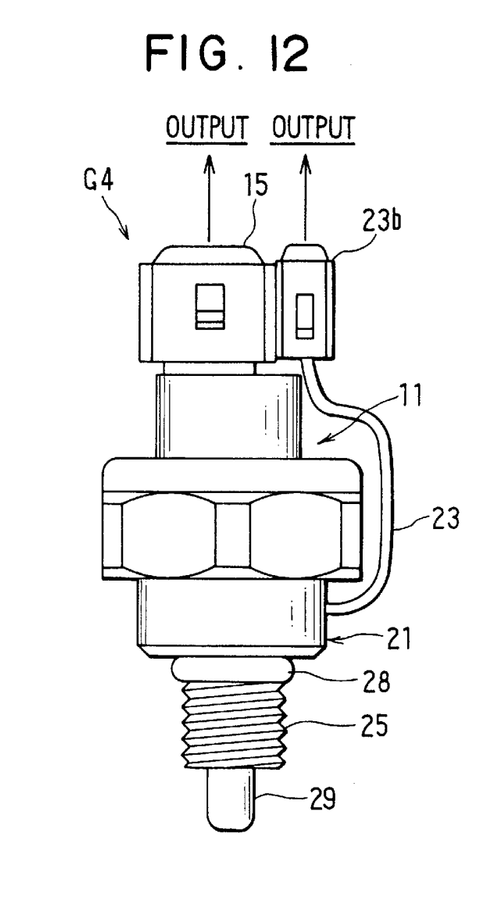
FIG. 12 is a schematic view showing the integrated sensor device in the sixth embodiment.

In a sixth preferred embodiment, as shown in FIGS. 11 and 12, the output wiring 23 extending from the temperature measurement part 20 has a connector 23b at an end thereof in place of the end portion 23a shown in FIGS. 2 and 3 in the first embodiment. In the first embodiment, electrical communication between the integrated sensor device G1 and the outside thereof is secured only through the one connector 15. As opposed to this, in the sixth embodiment, the electrical communication with the outside of the integrated sensor device may be obtained through more than one connector as shown in an integrated sensor device G4 shown in FIG. 12.

(Seventh Embodiment)

Figure 13:
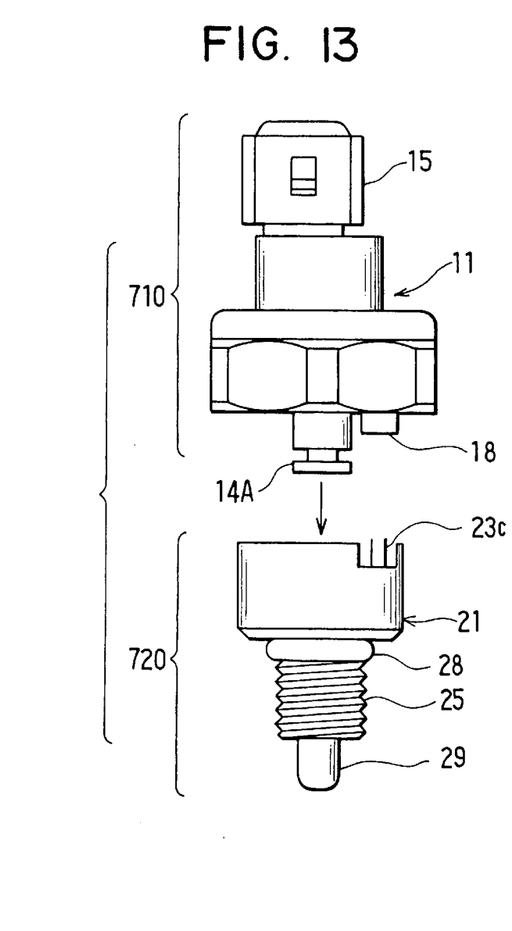
FIG. 13 is an exploded schematic view showing an integrated sensor device in a seventh preferred embodiment according to the present invention.
Figure 14:
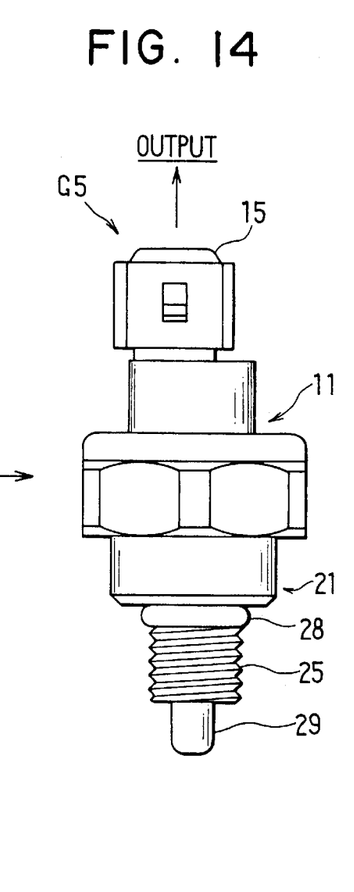
FIG. 14 is a schematic view showing the integrated sensor device in the seventh embodiment.

In a seventh preferred embodiment, as shown in FIG. 13, as soon as a pressure measurement part 710 and a temperature measurement part 720 are joined together, an output portion of the temperature measurement part 720 is connected to an output terminal 16 provided in the first housing 11 of the pressure measuring part 710. Specifically, the second housing 21 of the temperature measuring part 720 has output pins 23 to which an output signal is transmitted from the temperature measuring element part 22. The first housing 11 of the pressure measurement part 710 has a socket 18 to which the output terminal 16 is connected. In this embodiment, the pressure measurement part 710 and the temperature measurement part 720 respectively has the engagement portion 14A and the fixed hook portion 24B as in the fifth embodiment, so that the pressure measurement part 710 and the temperature measurement part 720 are joined together just by pushing. At the same time, the output pins 23c and the socket 18 are fitted to each other. As a result, an integrated sensor device G5 shown in FIG. 14 can be obtained.

(Eighth Embodiment)

Figure 15:
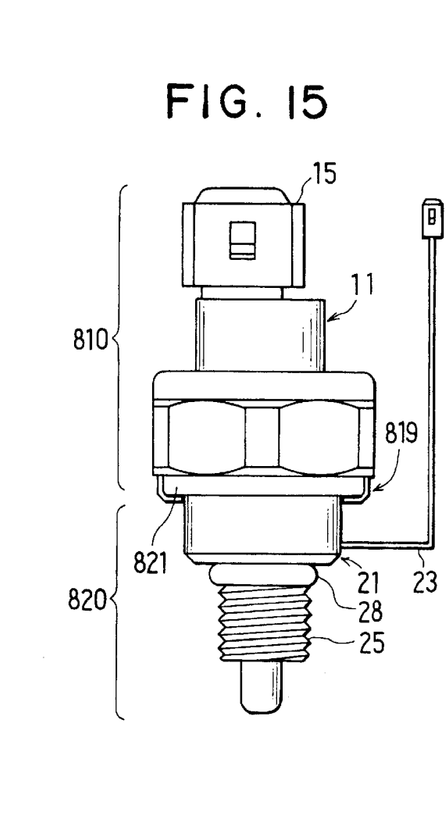
FIG. 15 is a schematic view showing an integrated sensor device in an eighth preferred embodiment according to the present invention.

In a eighth preferred embodiment, as shown in FIG. 15, a pressure measurement part 810 has a caulked portion 819, and a temperature measurement part 820 has a fixed portion 821. The other features of the pressure measurement part 810 and the temperature measurement part 820 are the same as the pressure measurement part 10 and the temperature measurement part 20 in the first embodiment. In the eighth embodiment, after the pressure measurement part 810 and the temperature measurement part 820 are joined together, the caulked portion 819 of the pressure measurement part 810 is caulked to be fixed on the fixed portion 821 of the temperature measurement part 820. As a result, the pressure measurement part 810 and the temperature measurement part 820 are more securely fixed to each other. The other effects are the same as those in the foregoing embodiments.

(Ninth Embodiment)

Figure 16A:
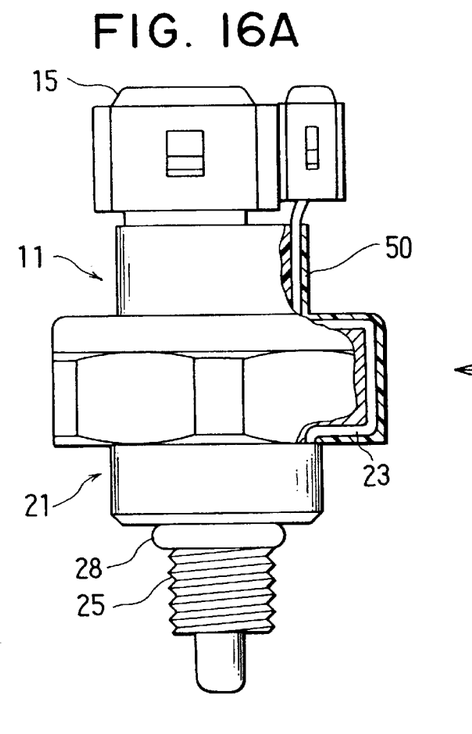
FIG. 16A is a schematic view showing an integrated sensor device in a ninth preferred embodiment according to the present invention.
Figure 16B:
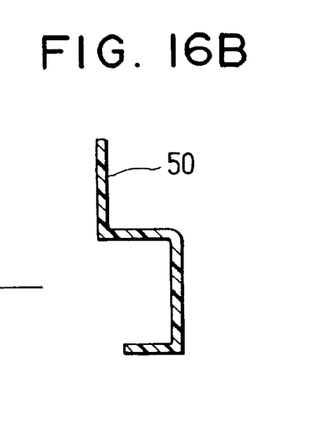
FIG. 16B is a cross-sectional view showing a cover for covering an output wiring of the integrated sensor device in the ninth embodiment.

A ninth preferred embodiment is a modification of the sixth embodiment shown in FIGS. 11 and 12. In the ninth embodiment, as shown in FIG. 16A, the output wiring 23 protrudes from the upper surface of the second housing 21 of the temperature measurement part 20 facing the first housing 11 of the pressure measurement part 10. Further, the first housing 11 has a groove which is intended to receive the output wiring 23. Accordingly, in the state where the pressure measurement part 10 and the temperature measurement part 20 are joined together, the output wiring 23 is received in the groove formed on the first housing 11, and is covered with an extra cover 50 shown in FIGS. 16A and 16B. As a result, the handling and the installation of the integrated sensor device becomes more easy. The other features and effects are the same as those in the foregoing embodiments. In the ninth embodiment, although the output wiring 23 protrudes from the upper surface of the second housing 21, it may protrude from the side surface of the second housing 21 as in the sixth embodiment. The cover 50 may be made of resin or metal.

In the above-mentioned embodiments, as shown in FIG. 1, the integrated sensor device is attached to the conduit A3. However, it may be attached to the receiver 4. Further, the sensors for sensing the pressure, temperature and acceleration of the refrigerant are utilized in the above-mentioned embodiments, it is apparent that the other sensors can be employed with the arrangement of such sensors being flexible. For example, the same kind of sensors which respectively detect a low pressure and a high pressure may be combined into one unit, and only the acceleration sensor and the temperature sensor may be combined into one unit.

In the above-mentioned embodiments, the pressure measurement part 10 (pressure sensor) is attached to the wall of the conduit A3 via the temperature measurement part 20, so that the above-mentioned effects are obtained. In this case, existing pressure sensors can be utilized as the pressure measurement part 10 of the present invention. That is, there is no need to design the pressure measurement part 10 and it is sufficient only to design the temperature measurement part 20. Therefore, the work load of the design of the integrated sensor device is small.

As described in the third embodiment, in the case where external threads and internal threads of sensors which are to be combined into one unit have the same diameter, the order combining the sensors can be changed if necessary. In the above-mentioned embodiments, the pressure measurement part has the external thread to be inserted into the internal thread of another measurement part, however, the pressure measurement part may have an internal thread to receive an external thread of another measurement part. In such a case, it is apparent that in the case where the diameters of the threads of the measurement parts are the same, the order combining the measurements parts can be arbitrarily changed.

Further, the size of the housing of each measurement part is arbitrarily changeable. For example, the first housing 11 of the pressure measurement part 10 may be larger than the second housing 21 of the pressure measurement part 20, and viceversa. In the first to ninth embodiments, the integrated sensor device is applied to the automotive air conditioning apparatus. In this case, the integrated sensor device may be attached to a member other than the conduit A3 and the position where the integrated sensor device is attached can be arbitrary selected based on the object of the sensors.

Further, the integrated sensor device can be applied to the other apparatuses. For example, it may be applied to a brake apparatus to detect a state of a brake fluid. Accordingly, the pressure, quality and the like of the brake fluid can be controlled. The integrated sensor device may be applied to a fueling system for an engine to detect a state of fuel injection. In this case, a fuel amount supplied (injected) to the engine can be controlled. Further, the integrated sensor device may be applied to a non-stage transmission to detect a state of an oil in a hydraulic circuit, so that a valve position of an oil control valve in the hydraulic circuit which controls a change gear ratio of the non-stage transmission is controlled. As a result, the loss of power in the non-stage transmission is reduced, so that a fuel consumption is improved and gear shift can be smoothly performed.

While the present invention has been shown and described with reference to the foregoing preferred embodiment, it will be apparent to those skilled in the art that changes in form and detail may be made therein without departing from the scope of the invention as defined in the appended claims.

What is claimed is:

1. An integrated sensor device for attaching to an attachment device holding a medium therein to detect a state of the medium, said integrated sensor device comprising:

a first housing having a first joining portion;

a first measuring unit installed in said first housing for detecting a first state of said medium;

a second housing, having a second joining portion, wherein said second joining portion detachably connects to a specific portion of said attachment device; and a second measuring unit installed in said second housing for detecting a second state of said medium;

wherein said second housing holding said second measuring unit therein detachably connects to said first housing holding said first measuring unit therein through said first joining portion;

wherein said first measuring unit communicates with an external area of said second housing to detect said first state when said second housing is connected to said first housing and said second joining portion is connected to said attachment device.

2. An integrated sensor device according to claim 1, wherein:

said first measuring unit comprises a pressure measuring unit for measuring a pressure of the medium; and said second measuring unit comprises a temperature measuring unit for measuring a temperature of the medium.

3. An integrated sensor device according to claim 1, further including a first O-ring disposed on said second joining portion to create an air-tight connection between said second joining portion of said second housing and the attachment device.

4. An integrated sensor device according to claim 1, wherein:

said first measuring unit has a first output terminal for outputting a first output signal therefrom;

said second measuring unit has a second output terminal for outputting a second output signal therefrom; and said first housing has a connector portion in which said first and second output terminals are arranged.

5. An integrated sensor device according to claim 4, further comprising an output wiring for connecting said second measuring unit to said second output terminal arranged in the connector, said output wiring protruding from said second housing and having an end which is adapted to be inserted into said first housing and to be electrically connected to said second output terminal.

6. An integrated sensor device according to claim 5, wherein said first housing has a socket on an outer surface thereof into which the end of said output wiring is to be inserted, said socket being electrically connected to said second output terminal.

7. An integrated sensor device according to claim 4, wherein:

said second housing has an output pin for connecting said second measuring unit and said second output terminal arranged in the connector, said output pin being electrically connected to said second measuring unit and protruding from a contacting surface of said second housing, said contacting surface contacting said first housing when said first and second housings are combined together; and said first housing has a socket into which said output pin is adapted to be inserted, said socket being electrically connected to said second output terminal.

8. An integrated sensor device according to claim 1, further comprising a second O-ring disposed between said first housing and said second housing to create an air-tight connection therebetween.

9. An integrated sensor device according to claim 1, wherein said first and second housings are welded together.

10. An integrated sensor device according to claim 1, wherein said first and second housings are made of different materials.

11. An integrated sensor device according to claim 1, wherein the first and second joining portions of said first and second housings comprise cylindrical threaded portions having the same diameter.

12. An integrated sensor device according to claim 11, wherein:

said first and second joining portions comprise external threads;

said second housing has a portion forming an internal thread for receiving said first joining portion of said first housing; and said attachment device has a portion forming an internal thread for receiving said second joining portion of said second housing.

13. An integrated sensor device according to claim 1, wherein said integrated sensor device is adapted to be attached to an air conditioning apparatus, and wherein said medium is a refrigerant of a refrigerating cycle.

14. An integrated sensor device according to claim 1, wherein said second housing comprises a conducting hole for conducting the medium into said first housing.

15. An integrated sensor device according to claim 14, wherein said second measuring unit is disposed in said second housing perpendicularly relative to an axial direction of the conducting hole.

16. An integrated sensor device according to claim 14, wherein the first measuring unit is disposed in said housing in parallel with an axial direction of said conducting hole.

17. An integrated sensor device for detecting a state of a medium, comprising:
   a first sensor unit for detecting a first state of said medium, said first sensor unit including:
      a first housing defining a first passage therein and having a first joining portion having a first structure; and
      a first sensor accommodated in said first housing and exposed to said first passage for detecting said first state of said medium; and
   a second sensor unit connected to said first sensor unit through said first joining portion for detecting a second state of said medium, said second sensor unit including:
      a second housing defining therein a second passage for introducing said medium toward said first sensor by communicating with said first passage, and having a second joining portion, said second joining portion having a second structure identical with said first structure of said first joining portion; and
      a second sensor accommodated in said second housing for detecting said second state of said medium.

18. An integrated sensor device according to claim 17, wherein both said first structure and said second structure comprise threads having the same diameter as each other.

19. An integrated sensor device according to claim 17, wherein only a part of said first sensor communicates with said first passage for detecting said first state of said medium.

20. An integrated sensor device according to claim 17, wherein said second sensor is disposed in a portion of said second housing other than in said second passage.

21. An integrated sensor device according to claim 17, wherein each of said first housing and said second housing is a single member.

22. An integrated sensor device according to claim 21, wherein said second sensor unit is detachably connected to said first sensor unit.

23. An integrated sensor device according to claim 17, wherein said medium is introduced toward said first sensor via said first passage and said second passage.

24. An integrated sensor device for detecting a pressure and temperature of a medium, comprising:
   a pressure sensor unit which detects a pressure of a medium, said pressure sensor unit including;
      a first housing defining a passage therein, said passage containing a pressure sensor, said first housing having a first joining portion, said passage opening to one surface of said first housing;
   a temperature sensor unit which detects a temperature of a medium, said temperature sensor unit having a second housing, said second housing including:
      an attachment device joining portion provided on an external surface of said second housing, said attachment device joining portion detachably connectable to an attachment device, said reachment device joining portion substantially fluidly sealing an outer surface of an inside portion from an outside surface of an outside portion when said attachment device joining portion is connected to said attachment device;
      an outside portion disposed on one side of said attachment device joining portion said outside portion external to said attachment device when said attachment device joining portion is connected to said attachment device,
      an inside portion disposed on an opposite side of said attachment device joining portion with respect to said outside portion, said inside portion positioned within said attachment device when said attachment device joining portion is connected to said attachment device, said inside portion having a temperature sensing portion which senses a temperature of a medium inside said attachment device,
      a channel disposed in said second housing which connects a surface of said inside portion and a surface of said outside portion;
      a temperature sensor thermally communicating with a surface of said inside portion to detect a temperature of said medium when said attachment device joining portion is attached to said attachment device, said temperature sensor outputting a signal representative of a temperature of said medium when said attachment device joining portion is attached to said attachment device;
      a temperature-sensor-unit joining, portion disposed on said outside portion, said temperature-sensor-unit joining portion detachably engageable to said first joining portion, an opening of said channel on said surface of said outside portion fluidly communicating with said first passage opening when said first joining portion is joined to said temperature-sensor-unit joining portion, whereby said medium is communicated to said pressure sensor.

25. An integrated sensor device for detecting a first state and second state of a medium, comprising;
   a first state sensor unit which detects a first state of a medium, said first state sensor unit including:
      a first housing defining a passage therein, said first passage containing a first state sensor, said first housing having a first joining portion, said first passage opening to one surface of said first housing;
   a second state sensor unit which detects a second state of a medium, said second state sensor unit having a second housing, said second housing including:
      a attachment device joining portion provided on an external surface of said second housing, said attachment device joining portion detachably connectable to an attachment device, said attachment device joining portion substantially fluidly sealing an outer surface of an inside portion from an outside surface of an outside portion when said attachment device joining portion is connected to said attachment device;
      an outside portion disposed on one side of said attachment device joining portion, said outside portion external to said attachment device when said attachment device joining portion is connected to said attachment device, an inside portion disposed on an opposite side of said attachment device joining portion with respect to said outside portion, said inside portion positioned within said attachment device when said attachment device joining portion is connected to said attachment device, said inside portion having a second state sensing portion which senses a second state of a medium inside said attachment device, a channel disposed in said second housing which connects a surface of said inside portion and a surface of said outside portion;

a second state sensor communicating with a surface of said inside portion to detect a second state of said medium when said attachment device joining portion is attached to said attachment device, said second state sensor outputting a signal representative of a second state of said medium when said attachment device joining portion is attached to said attachment device;

second sate-sensor-unit joining portion disposed on said outside portion, said second state-sensor-unit joining portion detachably engageable to said first joining portion, an opening of said channel on said surface of said outside portion fluidly communicating with said first passage opening when said first joining portion is joined to said second state-sensor-unit joining portion, whereby said medium is communicated to said first state sensor.

* * * * *